(12) United States Patent
Langford et al.

(10) Patent No.: US 7,233,463 B2
(45) Date of Patent: Jun. 19, 2007

(54) METHOD AND APPARATUS FOR DETECTING ELECTRICAL FAULTS AND ISOLATING POWER SOURCE FROM THE ELECTRICAL FAULTS

(75) Inventors: Joseph Andrew Langford, Duncanville, TX (US); Gregory Warren Osberne, Mensfield, TX (US)

(73) Assignee: Premier Aviation, Inc., Grand Prairie, TX (US)

( * ) Notice: Subject to any disclaimer, the term of this patent is extended or adjusted under 35 U.S.C. 154(b) by 156 days.

(21) Appl. No.: 10/715,182

(22) Filed: Nov. 17, 2003

(65) Prior Publication Data

US 2004/0145840 A1     Jul. 29, 2004

Related U.S. Application Data

(63) Continuation of application No. 10/076,177, filed on Feb. 13, 2002, now Pat. No. 6,650,516, which is a continuation of application No. 09/670,842, filed on Sep. 27, 2000, now abandoned, which is a continuation-in-part of application No. 09/603,069, filed on Jun. 26, 2000, now Pat. No. 6,671,144.

(51) Int. Cl.
    *H02H 3/00*     (2006.01)
(52) U.S. Cl. ..................................... 361/42
(58) Field of Classification Search .............. 361/42
    See application file for complete search history.

(56) References Cited

U.S. PATENT DOCUMENTS

| | | | |
|---|---|---|---|
| 3,634,729 A | 1/1972 | Hendry | |
| 3,766,435 A | 10/1973 | Childers | |
| 3,968,410 A | 7/1976 | Graham | |
| 3,992,650 A | 11/1976 | Iwasa et al. | |
| 4,068,149 A | 1/1978 | Wuchinich | |
| 4,068,276 A | * 1/1978 | Pintell | ............... 361/46 |
| 4,079,211 A | 3/1978 | Janssen | |

(Continued)

FOREIGN PATENT DOCUMENTS

JP      54-147875       11/1979

OTHER PUBLICATIONS

Quong, Resettable electronic fuse consists of SCR and relay; Sep. 15, 1977, Electronics, vol. 50, No. 19, p. 117.

*Primary Examiner*—Stephen W. Jackson
*Assistant Examiner*—Lucy Thomas
(74) *Attorney, Agent, or Firm*—Jones Day

(57) ABSTRACT

The present invention is a method and apparatus for protecting a power supply from electrical faults. The present invention operates substantially independently of the current drawn by the load. In addition, the present invention includes a time delay circuitry for preventing false detection of ground faults when the power source is connecting to the load. In a preferred embodiment, the apparatus of the present invention includes a control circuitry for connecting the power supply to the load. The apparatus also preferably includes a sensor circuitry for detecting electrical faults, including ground, transient, and arc faults, and triggering the control circuitry to disconnect the power source from the electrical faults when electrical faults are detected. Thus, the present invention can protect wiring and load connections from improper operation and fire hazards that may be caused by electrical faults. Finally, the apparatus preferably includes a fault protection condition indicator to indicate whether the circuit breaker circuitry is working properly.

11 Claims, 9 Drawing Sheets

U.S. PATENT DOCUMENTS

| | | |
|---|---|---|
| 4,121,122 A | 10/1978 | Pokrandt |
| 4,412,267 A | 10/1983 | Hansen |
| 4,580,186 A | 4/1986 | Parker et al. |
| 4,672,175 A * | 6/1987 | Niven .................... 219/130.4 |
| 4,860,154 A | 8/1989 | Fazlollahi |
| 4,878,034 A | 10/1989 | Gross et al. |
| 4,947,278 A | 8/1990 | Nichols, III |
| 4,949,214 A * | 8/1990 | Spencer ....................... 361/95 |
| 4,992,904 A | 2/1991 | Spencer et al. |
| 5,055,703 A | 10/1991 | Schornack |
| 5,185,684 A * | 2/1993 | Beihoff et al. ................ 361/45 |
| 5,237,480 A | 8/1993 | Dara |
| 5,424,894 A | 6/1995 | Briscall et al. |
| 5,532,898 A | 7/1996 | Price |
| 5,576,615 A | 11/1996 | Marshall et al. |
| 5,606,482 A | 2/1997 | Witmer |
| 5,627,411 A | 5/1997 | Bochenek |
| 5,657,195 A | 8/1997 | Rault |
| 5,659,894 A | 8/1997 | Bayruns et al. |
| 5,691,869 A | 11/1997 | Engel et al. |
| 5,825,602 A | 10/1998 | Tosaka et al. |
| 5,864,456 A | 1/1999 | Connor |
| 5,867,358 A | 2/1999 | Campbell |
| 5,883,578 A | 3/1999 | Roberts et al. |
| 5,933,311 A | 8/1999 | Chen et al. |
| 5,946,179 A | 8/1999 | Fleege et al. |
| 5,986,860 A | 11/1999 | Scott |
| 5,999,384 A | 12/1999 | Chen et al. |
| 6,034,446 A | 3/2000 | Kowalski et al. |
| 6,057,997 A | 5/2000 | Mackenzie et al. |
| 6,198,611 B1 | 3/2001 | Macbeth |

* cited by examiner

METHOD AND APPARATUS FOR DETECTING ELECTRICAL FAULTS AND ISOLATING POWER SOURCE FROM THE ELECTRICAL FAULTS

CROSS REFERENCE TO RELATED APPLICATION

This application is a continuation of application Ser. No. 10/076,177, filed on Feb. 13, 2002, now U.S. Pat. No. 6,650,516, which is a continuation of application Ser. No. 09/670,842, filed Sep. 27, 2000, now abandoned, which is a continuation-in-part of application Ser. No. 09/603,069, filed on Jun. 26, 2000 now U.S. Pat. No. 6,671,144.

FIELD OF THE INVENTION

The present invention relates generally to a circuit breaker circuitry for protecting a power source from electrical faults.

BACKGROUND OF THE INVENTION

Many devices known in the art are useful for protecting power sources from electrical faults. There are at least three types of electrical faults: a ground fault, a transient fault, and an arc fault. A ground fault occurs when a grounded conductor comes into contact with electrical circuitry, causing an excessive current flow in that circuitry. A transient fault occurs when a grounded conductor briefly comes into contact with an electrical circuitry, causing a temporary excessive current flow in that circuitry. As a result of the excessive current drawn by ground and transient faults, power supplies can become overloaded, and the load that a power supply is meant to power ends up receiving little or no current. An arc fault occurs when an arc is struck between two conductors that are not in physical contact but are close to each other. An arc can produce high temperatures in its vicinity, which can create a fire hazard.

Existing devices for protecting power sources from electrical faults use thermal sensors, magnetic sensors, and/or current sensors to detect electrical faults. For these devices, it is necessary to select and calibrate their sensors to accommodate the current drawn by the load for proper operation, making the existing fault protection devices load dependent. The process of selecting and calibrating particular sensors to the current drawn by the load is time consuming and expensive. Furthermore, these sensors must be recalibrated when the current drawn by the load changes significantly or if a different load is used.

Accordingly, there exists a need for an electrical fault detection and protection device that operates independently of the load so that no calibration of the sensor is needed and is cost-effective to construct.

SUMMARY

A circuit breaker circuitry in accordance with the present invention operates independently of the load to which a power source is connected. In addition, the preferred circuit breaker circuitry includes a time delay circuitry to prevent false detection of electrical faults resulting from current spikes that may occur when connecting the power supply to the load.

Preferably, the circuit breaker circuitry comprises a control circuitry that connects a power source to its load. The control circuitry disconnects the power source from the rest of the circuitry when an electrical fault is detected.

Preferably, the circuit breaker circuitry also comprises a sensor circuitry that detects electrical faults by monitoring the voltage drop across the control circuitry. When an electrical fault occurs in the circuit, a large current is drawn causing a significant potential drop across the control circuitry. The potential drop is in turn detected by the sensor circuitry. If an electrical fault threatens to interfere with the proper operation of the power supply, the sensor circuitry causes the control circuitry to disconnect the power source from the electrical faults, thus protecting the power source.

After the electrical fault has passed or is removed and a circuit breaker circuitry is reset, either manually or automatically, power returns to the control circuitry and the connection between the power source and the load is restored. Preferably, the time delay circuitry delays the activation of the sensor circuitry. This delay functions to shield the sensor circuitry from any current spikes that may occur when connecting the power source to the load and prevents false detection of electrical faults.

Preferably, the circuit breaker circuitry also includes a fault protection condition indicator for indicating whether the circuit breaker circuitry is working properly.

DETAILED DESCRIPTION OF THE INVENTION

Figure 1:
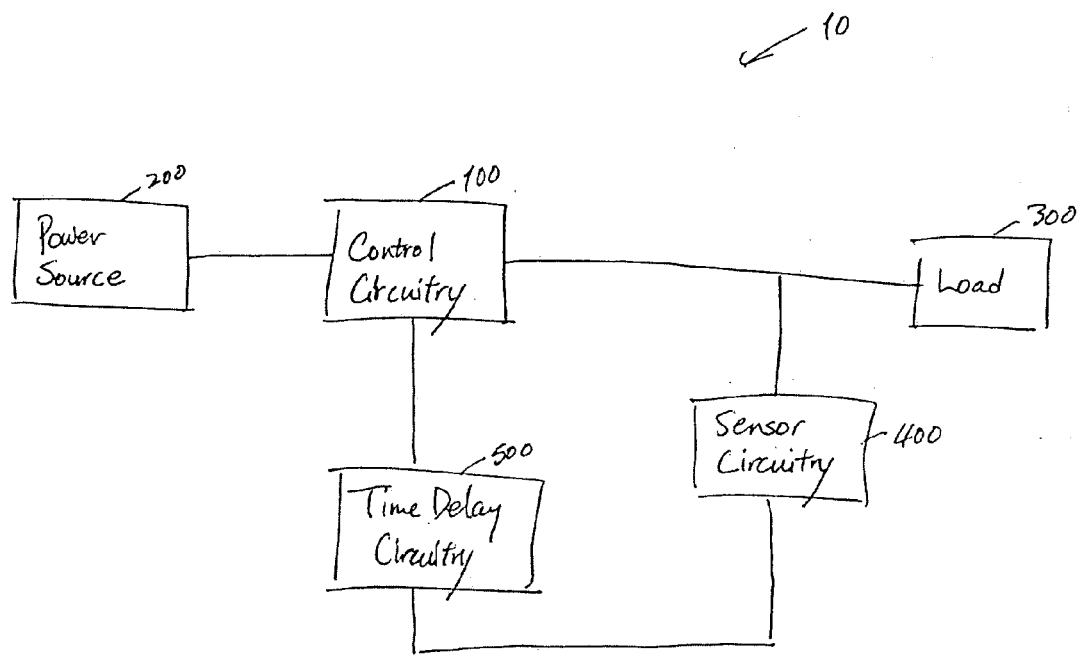
FIG. 1 is a block diagram of an embodiment of the present invention that protects against ground faults.

FIG. 1 illustrates a circuit breaker circuitry in accordance with the present invention that protects against ground faults. It includes a control circuitry 100, a sensor circuitry 400, and a time delay circuitry 500. Control circuitry 100 connects power source 200 to load 300. Sensor circuitry 400 causes control circuitry 100 to isolate power source 200 from circuit breaker circuitry 10 when sensor circuitry 400 detects a electrical fault. When the electrical fault is removed and the control circuitry 100 is reset, control circuitry 100 reconnects power source 200 to circuit breaker circuitry 10. While control circuitry 100 is being reset or when control circuitry 100 initially connects power source 200 to its load, a current spike may occur as a result of connecting load 300 to power source 200. Time delay circuitry 500 isolates sensor circuitry 400 from this current spike to prevent false electrical fault detection. Control circuitry 100, sensor circuitry 400, and time delay circuitry 500 are connected in such a way that circuit breaker circuitry 10 operates independently of load 300, as will be illustrated by the preferred embodiments below.

Figure 2:
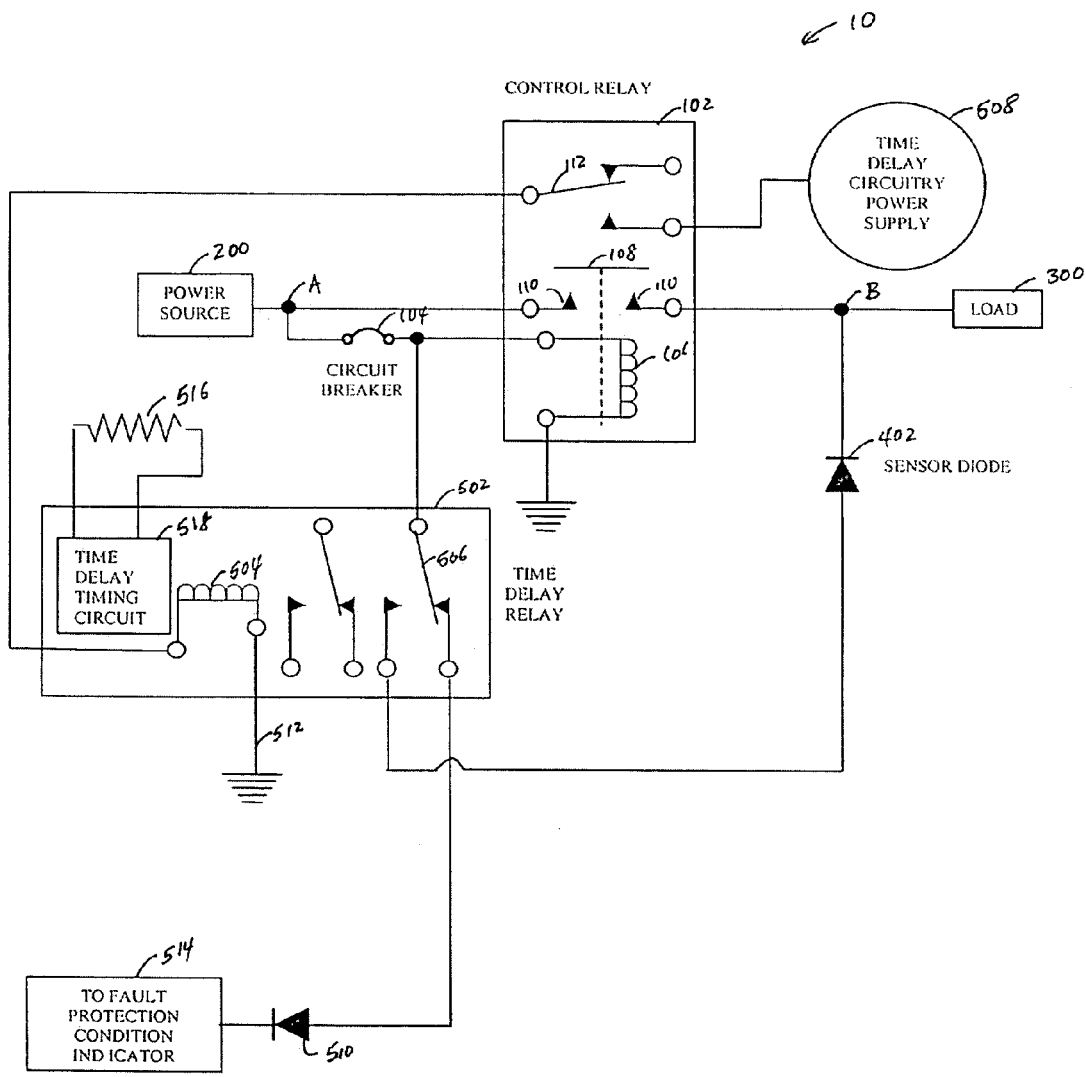
FIG. 2 is a schematic of an embodiment of the present invention that protects against ground faults including a power switching time delay relay.

A schematic of an embodiment of the present invention is shown in FIG. 2. In this embodiment, control circuitry 100 includes a control relay 102 and circuit breaker 104. Although various relays and circuit breakers may be used, the preferred control relay 102 and circuit breaker 104 are the Cutler Hammer SM150D2 relay and the Klixon 7277-2-½ circuit breaker respectively. Control relay 102 includes control coil 106, control armature 108, resistive contacts 110, and time delay circuitry switch 112. Control armature 108 connects power source 200 to load 300 when it engages resistive contacts 110. Although biased away from resistive contacts 110, control armature 108 engages resistive contacts 110 when control coil 106 creates a magnetic field that pulls control armature 108 to resistive contacts 110. Similarly, time delay switch 112, which is biased to engage an open circuit, connects to time delay circuitry power supply 508 when control coil 106's magnetic field pulls time delay switch 112 to time delay circuitry power supply 508, powering time delay relay 502. Circuit breaker 104 connects power source 200 to control coil 106 to supply control coil 106 with the necessary current to create its magnetic field. Circuit breaker 104 also connects power source 200 to time delay relay 502 and sensor diode 402.

Sensor circuitry 400 (see FIG. 1) includes a sensor diode 402 (see FIG. 2) that monitors the voltage drop across control relay 102 at points A and B. Although various diodes may be used, a preferred sensor diode 402 is the Motorola 1N4005 diode. Sensor diode 402 connects to point A on one terminal via sensor circuitry switch 506 and circuit breaker 104. Sensor diode 402 connects to point B directly on the other terminal. Sensor diode 402 is biased to allow current to flow from point A to point B, but it will only allow current to flow through when the voltage drop across control relay 102 is greater than sensor diode 402's forward voltage, typically 0.6 volts. Since resistive contacts 110 have very low resistance, the voltage drop across control relay 102 exceeds sensor diode 402's forward voltage only when a high current is drawn from power source 200, which occurs when there is a ground fault. When sensor diode 402 allows current to flow through it, that same current flows through circuit breaker 104, causing circuit breaker 104 to overload and become an open circuit.

Also shown in FIG. 2, time delay circuitry 500 (see FIG. 1) includes a time delay relay 502, a time delay circuitry power supply 508, a fault protection diode 510, and a fault protection condition indicator 514. Although various time delay relays may be used, the preferred time delay relay 502 is the NCC L1F-00010-562 time delay relay. Time delay relay 502 includes a timing resistor 516, a timing circuit 518, a time delay coil 504, and a sensor circuitry switch 506. Timing resistor 516 and timing circuit 518 operate together to delay switching of sensor circuitry switch 506 when time delay relay 502 is activated. The resistance value of timing resistor 516 determines the length of the time delay. In the NCC L1F-00010-562 time delay relay, the period of time delay may be varied from 10 ms to 10 s.

Sensor circuitry switch 506 connects sensor diode 402 to circuit breaker 104 when sensor circuitry switch 506 engages sensor diode 402. Although biased to connect to fault protection diode 510, sensor circuitry switch 506 connects to sensor diode 402 under the force of the magnetic field created by time delay coil 504. Time delay circuitry power supply 508, which is connected to control relay 102, provides time delay coil 504 with the necessary current to generate its magnetic field. Fault protection diode 510 is biased to conduct current from the power source 200 to fault protection indicator 514 in the event that control relay 102 connects power source 200 to load 300 while time delay relay 520 fails to activate.

In operation, the preferred embodiment of FIG. 2 functions as follows. When no ground fault is detected, control armature 108, which is in engagement with resistive contacts 110 under the force of control coil 106's magnetic field, connects power source 200 to load 300. Power source 200 supplies the necessary current via circuit breaker 104 to the control coil 106 for generating the magnetic field. Control coil 106's magnetic field also engages time delay circuit switch 112 with time delay relay power supply 508, supplying power to time delay relay 502.

Sensor diode 402 monitors the voltage drop across control relay 102 via points A and B. Sensor diode 402 is in voltage contact with point A on one terminal via sensory circuitry switch 506 and circuit breaker 104 and is directly connected to point B on the other terminal. Sensor circuitry switch 506 is held in contact with sensor diode 402 by time delay coil 504's magnetic field. Time delay circuitry power supply 508 provides the necessary current to time delay coil 504 via time delay circuit switch 112 to generate the magnetic field.

The voltage drop across points A and B is caused by resistive contacts 110 of control relay 102. Normally, load 300 does not draw enough current from power source 200 to cause enough voltage drop across points A and B to activate sensor diode 402, which typically requires a forward voltage of 0.6 volts for activation. However, when a ground fault occurs, the ground fault draws a high quantity of current from power source 200, causing the voltage drop across resistive contacts 110 and, consequently, the voltage drop across points A and B to exceed the forward voltage of sensor diode 402. In alternate embodiments, sensor diode 402 can be made more sensitive to current drawn by a ground fault by using a diode with a lower forward voltage rating. Sensor diode 402 can also be made more sensitive to current drawn by a ground fault by placing a shunt resistor in series with resistive contacts 110 between points A and B so as to raise the potential drop across points A and B. As a result of exceeding its forward voltage, sensor diode 402 becomes active and begins to conduct current from power source 200 to the ground fault through circuit breaker 104.

Circuit breaker 104 responds to the surge in current by opening the circuit, disconnecting power source 200 from control coil 106. Without current from power source 200, control coil 106 loses its magnetic field, releasing control armature 108 from resistive contacts 110. As a result, power source 200 is isolated from the ground fault as well as most of the circuit breaker circuitry 10. The loss of magnetic field in the control relay 102 also releases time delay circuitry switch 112 disconnecting time delay relay 502 from time delay circuitry power supply 508. Consequently, time delay coil 504 also loses its magnetic field, disconnecting sensor circuitry switch 506 from sensor diode 402.

At this point, power source 200 is isolated from the ground fault and time delay relay 502 is without power. In order to reactivate the circuit breaker circuitry 10 and allow current to again flow from power source 200 to load 300, the ground fault needs to be removed and the circuit breaker 104 needs to be manually reset.

After circuit breaker 104 is reset (typically manually), power source 200 restores current to control coil 106, generating a magnetic field in control relay 102. The magnetic field engages control armature 108 and time delay circuit switch 112 to resistive contacts 110 and time delay circuitry power supply 508 respectively. As a result, power source 200 is again connected to load 300 and time delay relay 502 is activated.

Figure 3:
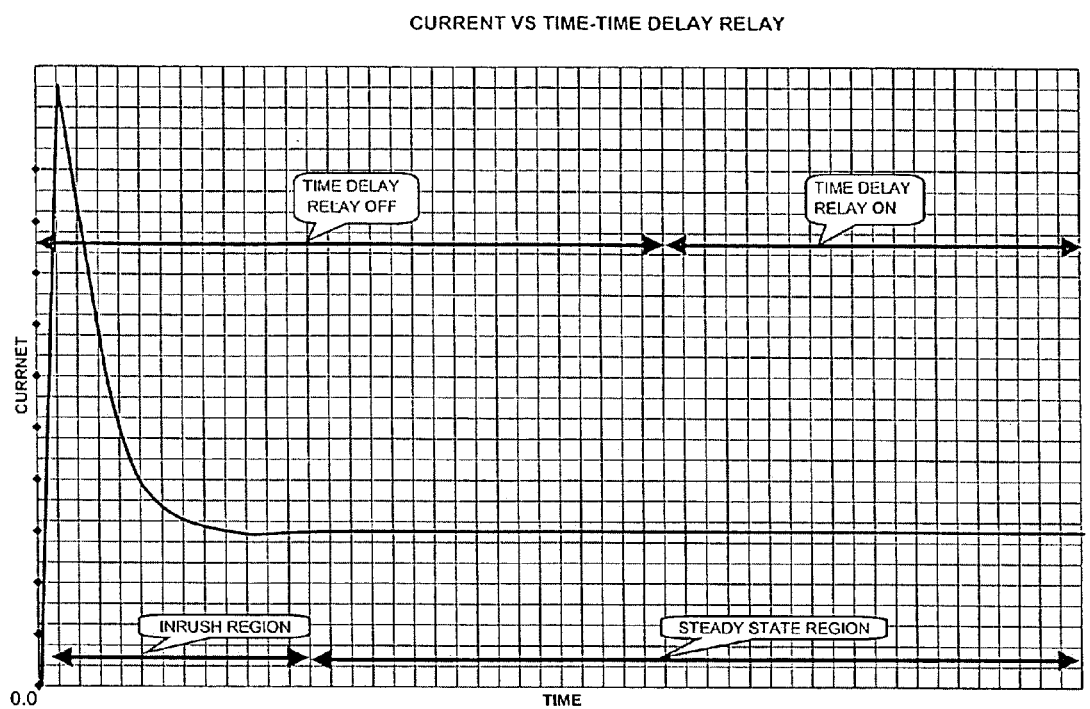
FIG. 3 depicts the temporal relationship between a current spike caused by connecting a power supply to its load compared to the time delay caused by the time delay circuitry.

When control armature 108 connects power source 200 to load 300, a current spike may occur which results in a temporary high potential drop across points A and B that may falsely activate sensor diode 402. Time delay relay 502 functions to isolate sensor diode 402 from effects of the current spike by connecting sensor diode 402 to point A only after enough time has passed for the current spike to subside. The period of time delay is determined by timing resistor 516 and timing circuit 518. FIG. 3 illustrates the current spike as a function of time in relation to the time delay created by time delay relay 502.

If, during the process of resetting circuit breaker circuitry 10, sensor circuitry switch 506 fails to engage the sensor diode 402, fault protection diode 510 is activated, conducting current from the power source 200 to the fault protection condition indicator 514. Fault protection condition indicator 514 then warns of improper resetting of the circuit breaker circuitry 10. If, however, sensor circuitry switch 506 properly connects to sensor diode 402, fault protection condition indicator 514 indicates proper operation and circuit breaker circuitry 10 resumes normal conditions, where control relay 102 connects power source 200 to the load 300 and sensor diode 402 monitors the voltage drop across points A and B.

Figure 4:
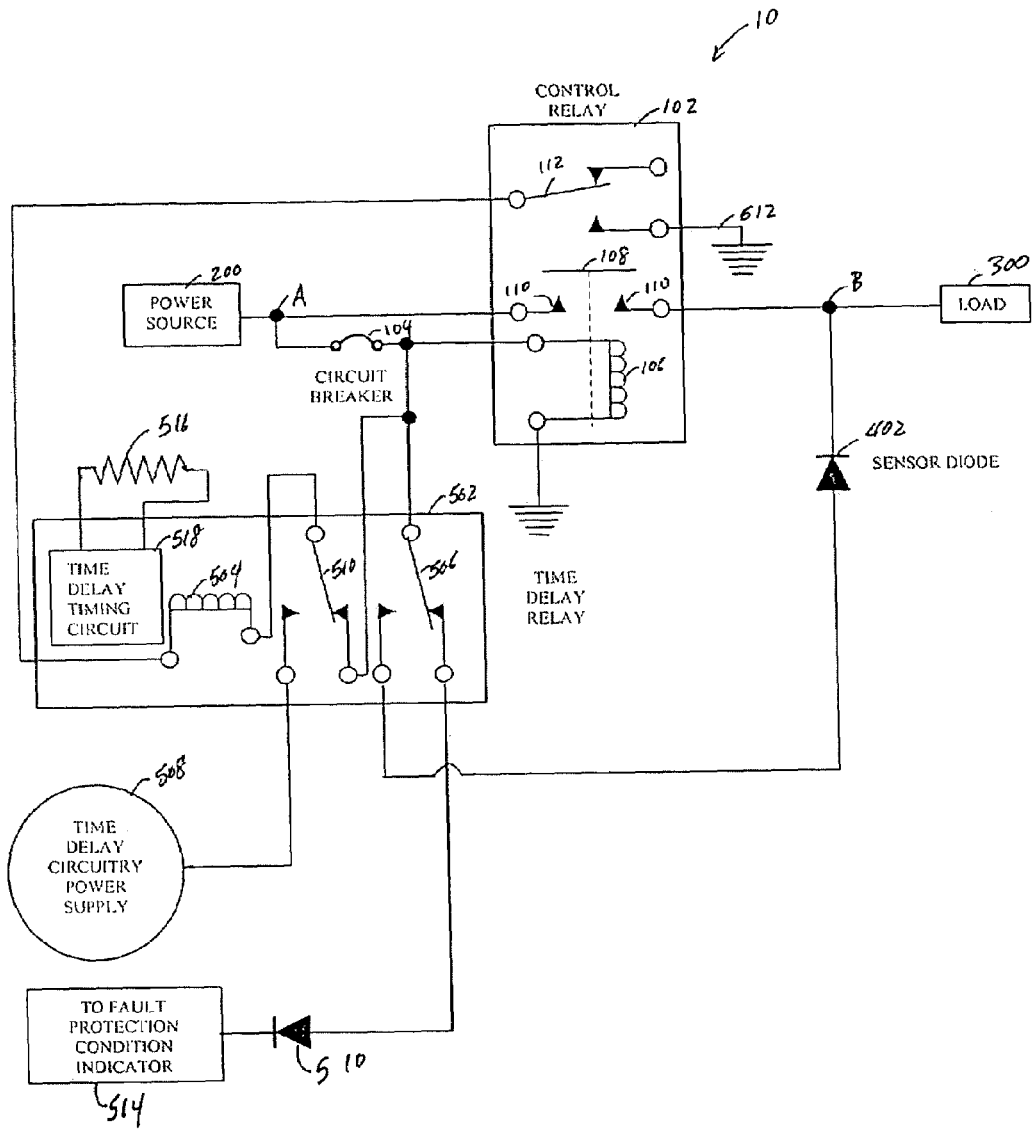
FIG. 4 depicts a detailed schematic of an alternate embodiment of the present invention that protects against ground faults including a ground switching time delay relay.

In an alternate preferred embodiment illustrated in FIG. 4, time delay relay 502 can be ground switching rather than power switching, as was described above. In the ground switching embodiment, time delay circuitry power supply 508 connects to time delay relay coil 504 via time delay coil switch 510, and ground 512 is connected to control relay 102.

Operation of the alternate preferred embodiment depicted in FIG. 4 is similar to the operation of the preferred embodiment of FIG. 2. They differ only in the following two ways. First, when circuit breaker 104 becomes an open circuit in response to a ground fault and, consequently, control coil 106 loses its magnetic field, time delay switch 112 switches from ground 512 to an open circuit rather than from the time delay circuitry power supply 508 to open circuit as in the power switching relay embodiment above. Second, when circuit breaker 104 is manually reset, time delay relay 502 initially draws current from power source 200 rather than from time delay circuitry power supply 508 as in the power switching relay embodiment above. Only after the time delay caused by timing resistor 516 and timing circuit 518 does time delay coil 504 generate a magnetic field to pull time delay coil switch 510 to engage time delay circuitry power supply 508, powering time delay relay 502 in steady state.

Figure 5:
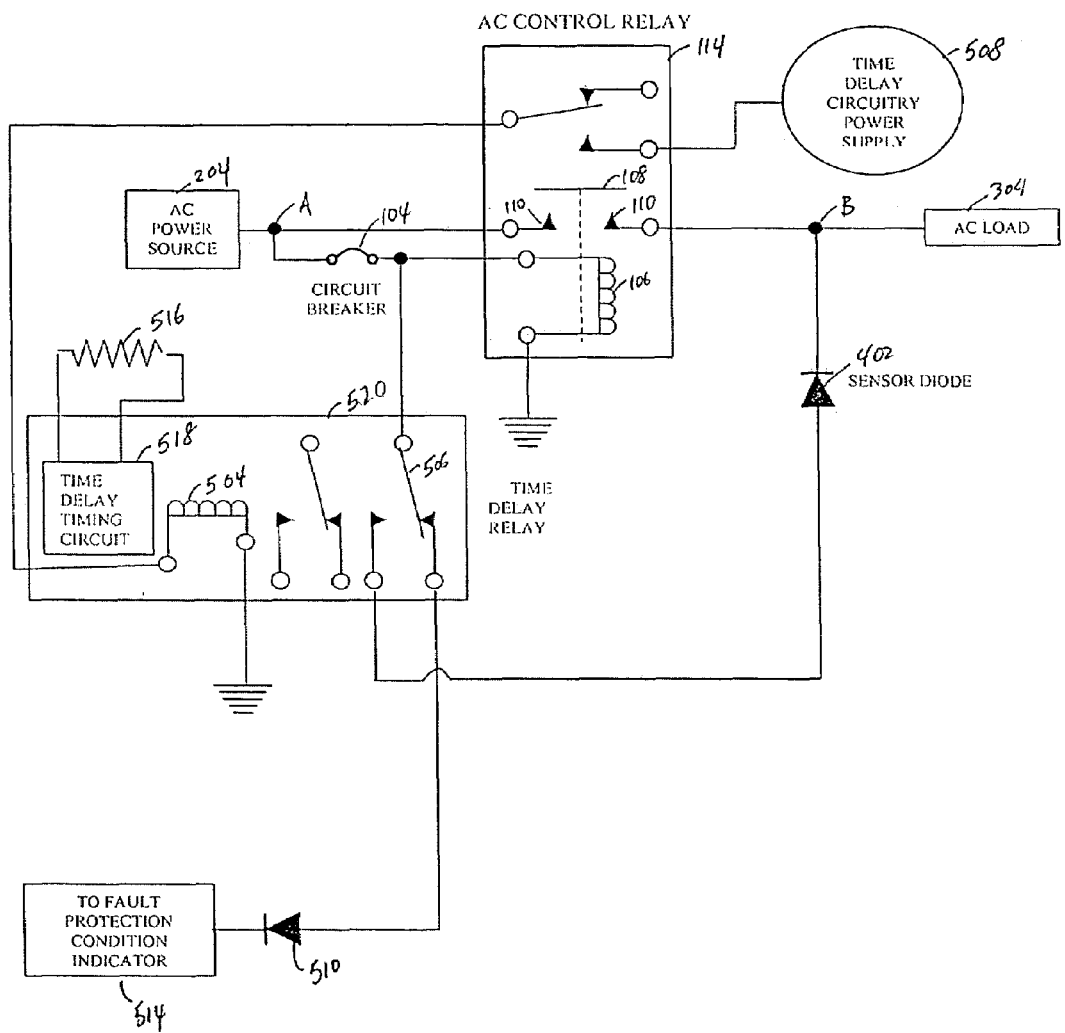
FIG. 5 is a schematic of an embodiment according of the present invention that works with AC signals.

The preferred embodiment can also be modified to operate with AC signals. One such embodiment is shown in FIG. 5. The preferred circuitry depicted in FIG. 5 is similar to the one depicted in FIG. 2; the differences exist only in the components used. Specifically, relay 114 is an AC relay rather than a DC relay. In addition, power source is an AC power source 204, and the load is an AC load 304.

Figure 6:
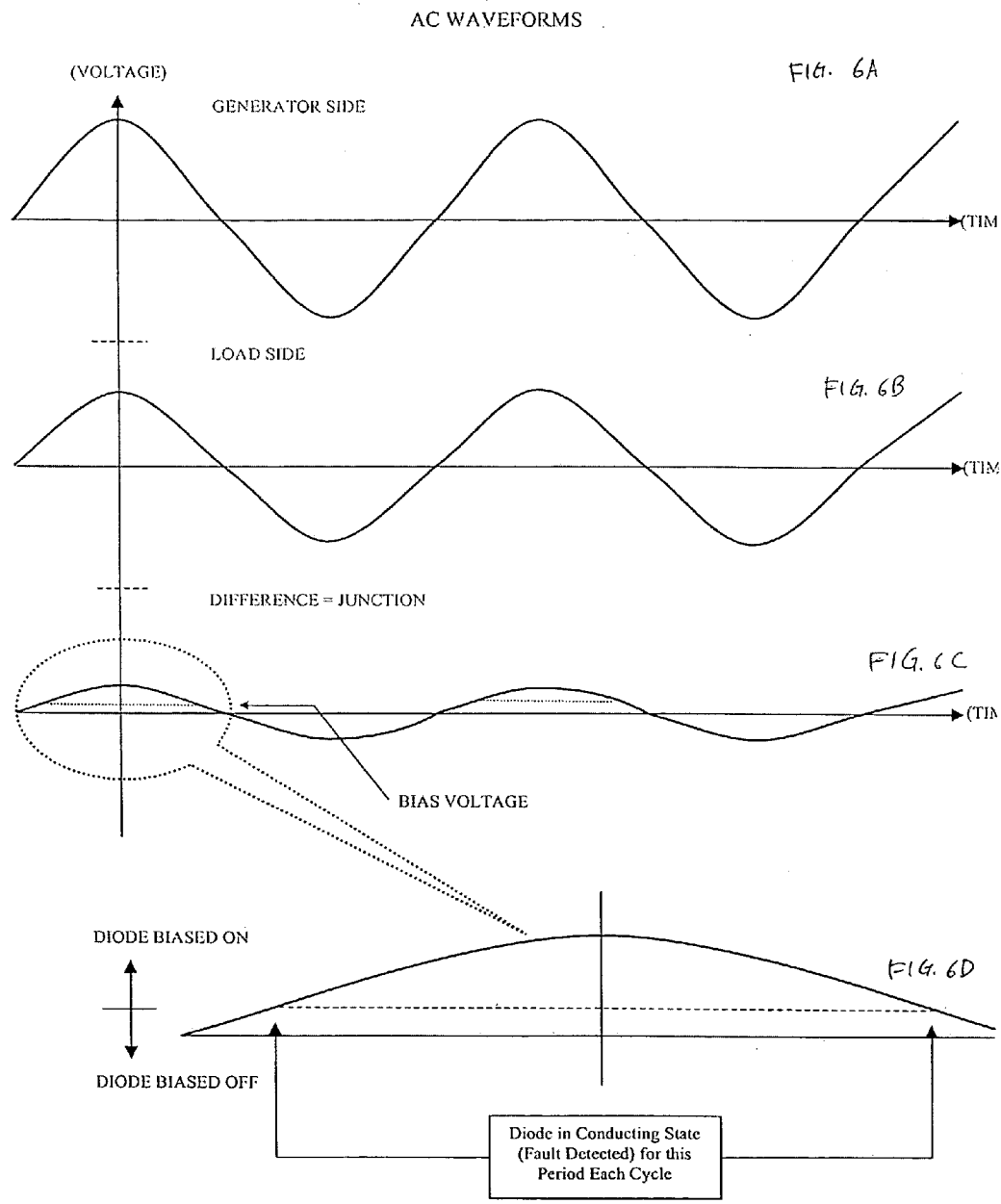
FIG. 6A depicts an AC signal from a AC generator.
FIG. 6B depicts the AC signal of FIG. 6A after the signal passes through the control relay.
FIG. 6C depicts the difference in AC signals of FIG. 6A and FIG. 6B.
FIG. 6D depicts a portion of the AC signal of FIG. 6C in further detail.

Operationally, the AC embodiment of FIG. 5 functions similarly to the DC embodiment of FIG. 2. The only difference is that an AC power source 204 powers control coil 106 and an AC signal activates sensor diode 402. FIG. 6A depicts the AC signal seen at point A, which is the signal from AC power source 204. FIG. 6B depicts the signal seen at point B, which is the AC signal seen at point A reduced by voltage drop across resistive contacts 110. FIG. 6C depicts the difference between the two AC signals. If a ground fault occurs, the voltage difference between points A and B becomes large enough to activate sensor diode 402. Tis condition is depicted in FIG. 6D, where the positive peak of the AC signal exceeds the forward voltage of sensor diode 402, causing the sensor diode 402 to activate and conduct current through circuit breaker 104. Consequently, circuit breaker 104 becomes an open circuit.

In the above AC embodiment, due to the polarity of sensor diode 402, sensor diode 402 can only be tripped during the positive portion of the AC signal from power source 200. In an alternate embodiment, a second sensor diode may be added in parallel but in an opposite polarity to sensor diode 402, so that the second sensor diode can be tripped in the same manner as sensor diode 402 but during the negative portion of the AC signal from power source 200. In essence, with the second sensor diode, the AC embodiment is able to perform full-wave detection rather than half-wave detection.

Figure 7:
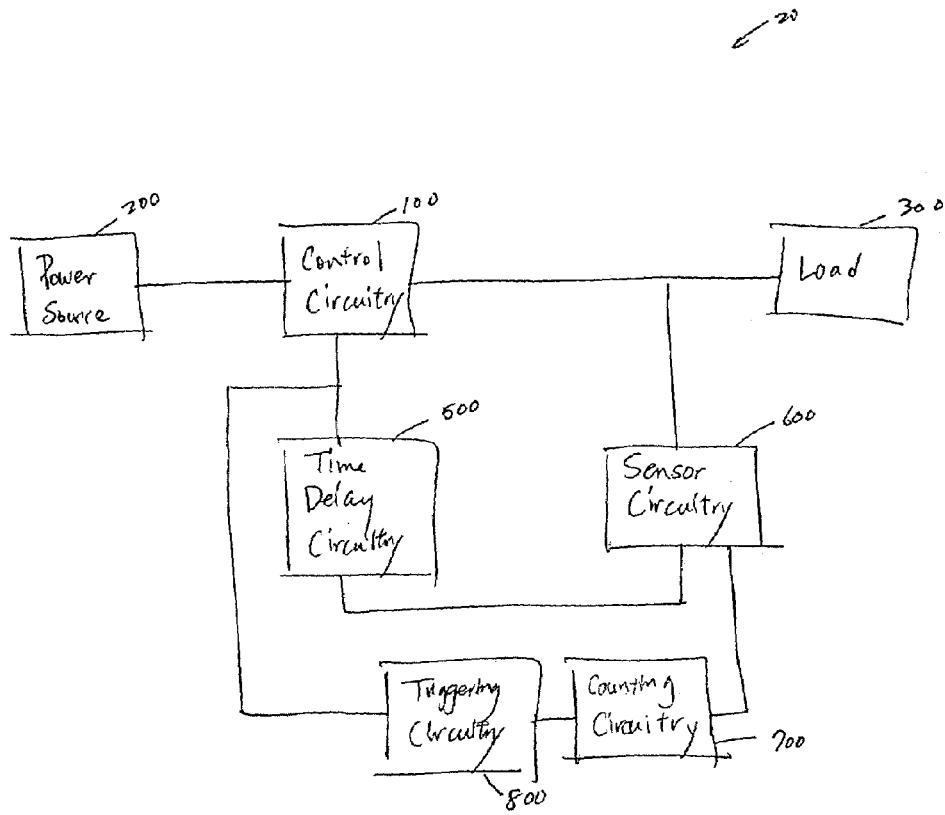
FIG. 7 is a block diagram of an embodiment of the present invention that protects against transient, arc, and ground faults.

While the above embodiments detect ground faults and protect power source from the ground faults, these embodiments can be modified to detect transient and arc faults in addition to ground faults and protect the power source from all three electrical faults. FIG. 7 illustrates the transient, arc, and ground fault circuit breaker circuitry 20.

As illustrated in FIG. 7, transient, arc, and ground fault circuit breaker circuitry 20 in accordance with the present invention includes a control circuitry 100, a time delay circuitry 500, a sensor circuitry 600, a counting circuitry 700, and a triggering circuitry 800. Control circuitry 100 and time delay circuitry 500 are the same control circuitry and time delay circuitry described in connection with FIG. 1. Sensor circuitry 600 detects arc and transient electrical faults in addition to ground faults. If a ground fault is detected, sensor circuitry 600 signals control circuitry 100 to disconnect power source 200. If transient or arc faults are detected, sensor circuitry 600 signals counting circuitry 700 to count transient or arc fault occurrences. If frequent transient or arc fault occurrences are detected, indicating a possible fire hazard and threat to proper operation of power source 200, counting circuitry 700 signals triggering circuitry 800 to trigger control circuitry 100 to disconnect power source 200.

Figure 8:
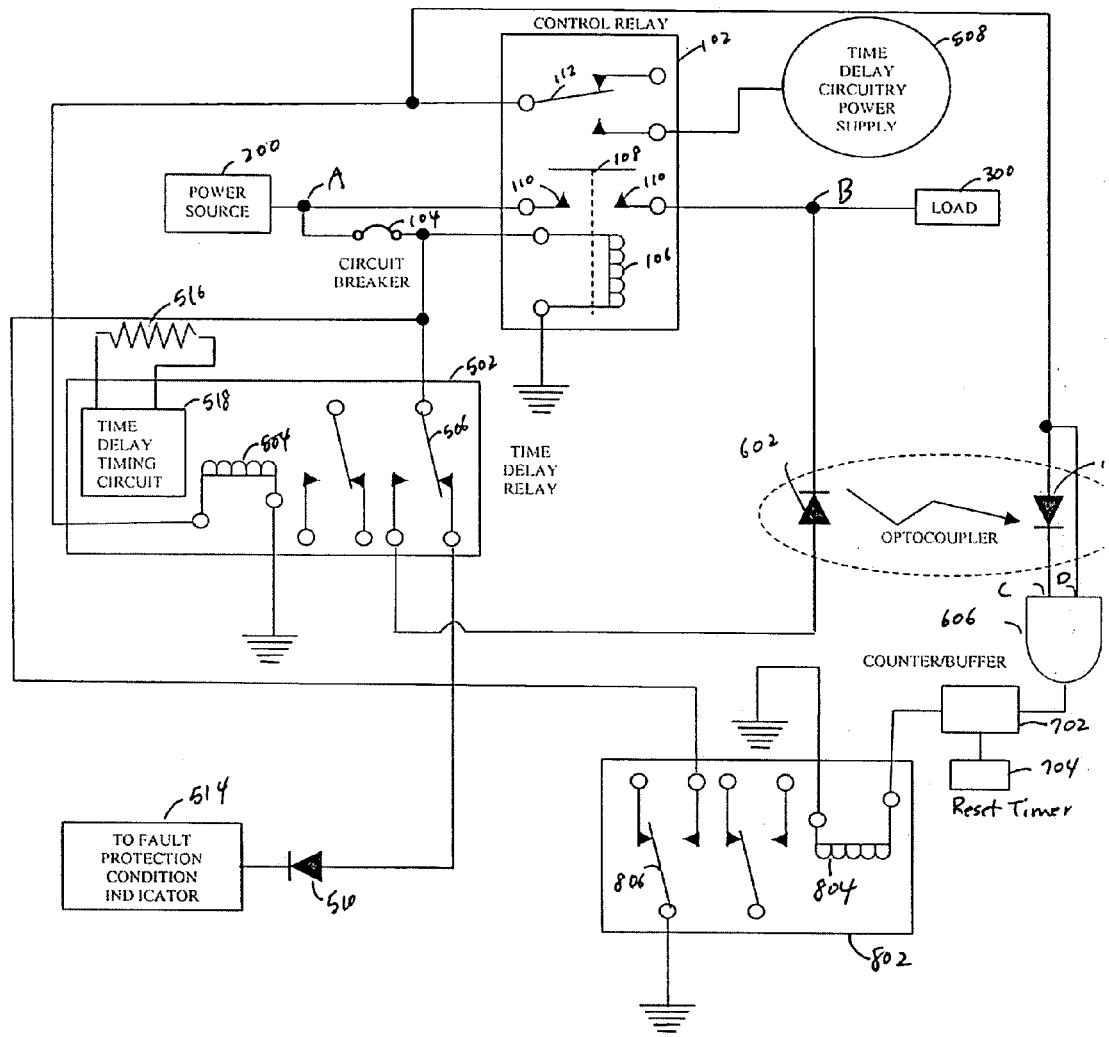
FIG. 8 is a schematic of an embodiment of the present invention that protects against transient, arc, and ground faults.

A schematic of transient, arc, and ground fault circuit breaker circuitry 20 in accordance with an embodiment of the present invention is shown in FIG. 8. Sensor circuitry 600 includes an optocoupler emitting diode 602, an optocoupler detecting diode 604, and an AND gate 606. Counting circuitry 700 includes a counter 702 and a reset timer 704. Triggering circuitry 800 includes a trigger relay 802. Trigger relay 802, in turn, includes a trigger circuitry coil 804 and a switch 806.

One terminal of optocoupler emitting diode 602 connects to point A through circuit breaker 104 and sensor circuitry switch 506 and the other terminal connects directly to point B. When activated, optocoupler emitting diode 602 is biased to allow current to flow from point A to point B and, in addition, emits an electromagnetic wave which can be detected by optocoupler detecting diode 604.

One terminal of optocoupler detecting diode 604 connects to time delay circuitry power supply 508 through control relay 102 and the other terminal connects to input C of AND gate 606. Optocoupler detecting diode 604 becomes active when it detects electromagnetic waves emitted by optocoupler emitting diode 602. When activated, optocoupler detecting diode 604 is biased to allow current to flow from time delay circuitry power supply 508 to input C of AND gate 604. Input D of AND gate 606 connects to the time delay circuitry power supply 508 through control relay 102. Therefore, when optocoupler detecting diode 406 is active, both AND gate 606's inputs are connected to time delay circuitry power supply 508, which causes AND gate 606 to output a high signal.

The output of AND gate 606 connects to the input of counter 702, and indicates whether a transient or arc fault has been detected by sensor circuitry 600. Reset timer 704 connects to counter 702 so that it can periodically reset counter 702. The output of counter 702 connects to trigger circuitry relay coil 804 of trigger relay 802. Finally, switch 806 of trigger relay 802 connects circuit breaker 104 to ground when it is under magnetic force created by trigger circuitry relay coil 804.

In operation, when a transient or arc fault occurs, it draws an unusually large current that flows across resistive contacts 110 of control relay 102. This current causes a voltage drop across points A and B that may be large enough to exceed the forward voltage of optocoupler emitting diode 602, activating optocoupler emitting diode 602. The forward voltage of optocoupler emitting diode 602 is typically 1.5 volts. When it is activated, optocoupler emitting diode 602 conducts current from point A to point B through circuit breaker 104 and emits an electromagnetic wave which optocoupler detecting diode 604 is able to detect. Although current flows across circuit breaker 104 while optocoupler emitting diode 602 is active, due to the temporary nature of transient and arc faults, optocoupler emitting diode 602 does not stay active long enough to allow current to flow across circuit breaker 104 for a sufficient period of time to overload it.

When optocoupler detecting diode 604 detects the electromagnetic wave emitted by optocoupler emitting diode 602, optocoupler detecting diode 604 is activated, connecting time delay circuitry power supply 508 to input C of AND gate 606. With both inputs now connected to time delay circuitry power supply 508, the output of AND gate 604 toggles from a low signal to a high signal.

When transient or arc fault disappears, optocoupler diodes 602, 604 become inactive. As a result, input C of AND gate 606 is no longer connected to time delay circuitry power supply 508, causing the output of AND gate 606 to toggle back to a low signal. The result is that AND gate 606 outputs a non-zero signal, such as a square wave, for each transient or arc fault that occurs in the circuit. Counter 702 receives this signal from AND gate 606 and accordingly increases its count of transient or arc fault occurrences by one. In this fashion, counter 702 is able to keep a running count of the number of transient or arc fault occurrences.

Reset timer 704 periodically resets counter 702 to start over and begin counting from zero. For example, reset timer 704 may reset counter 702 at periodic time interval T. This in turn causes counter 702 to count the number of transient and/or arc faults that occurs within time period T. For example, if the time interval T is set to 500 milliseconds and the predetermined number of faults is set to three, if three faults are detected within a 500 milliseconds interval, the output of counter 702 will toggle from a low signal to a high signal.

The high signal from counter 702 supplies current to sensor circuitry coil 804 of sensor circuitry relay 802. The current from counter 702 allows sensor coil 804 to generate a magnetic field that pulls switch 806 in contact with circuit breaker 104, grounding power supply 200 through circuit breaker 104. Circuit breaker 104 overloads and opens due to the rush of current from power supply 200, which in turn results in the isolation of power source 200 as described in connection with FIG. 2.

When ground faults occur rather than transient or arc faults, a ground fault always lasts long enough to activate optocoupler 602 and draw current through circuit breaker 104 for a sufficient time period to overload circuit breaker 104.

Like circuit breaker circuitry 10 (FIGS. 1 and 2), when circuit breaker circuitry 20 is reset, time delay circuitry 500 delays connection of sensor circuitry 600 to control circuitry 100 in order to isolate sensor circuitry 600 from any current spikes resulting from connecting power source 200 to load 300. Isolation of sensor circuitry 600 from current spikes prevents false detection of electrical faults.

Importantly, circuit breaker circuitry 10 in accordance with the disclosed embodiments, operates independently of load 300; that is, nothing in circuit breaker circuitry 10 is required to be calibrated to a particular load 300 in order for it to operate properly. In a typical relay, resistive contacts 110 have resistance on the order of 0.0003 Ohms. In order to activate sensor diode 402, which typically requires a forward voltage of 0.6 volts, the current drawn would have to be on the order of 2000 Amps. Even with power source 200 supplying a high voltage of about 200 volts, any mechanism that can activate the sensor diode would have to have less than 0.1 Ohms resistance. Since load 300 would have a much larger resistance than 0.1 Ohms, the voltage drop across points A and B caused by load 300 is negligible to sensor diode 400 such that, without having to specially calibrate a typical relay or diode, circuit breaker circuitry 10 can be connected to most any load 300 and operate properly.

Circuit breaker circuitry 20 similarly operates independently of load 300. Again, in a typical relay, resistive contacts 110 have resistance on the order of 0.0003 Ohms. In order to activate optocoupler emitting diode 602, which typically requires a forward voltage of 1.5 volts, the current drawn would have to be on the order of 6000 Amps. Even with power source 200 supplying a high voltage of, for example, about 150 volts, any mechanism that can activate sensor diode would have to have less than 0.025 Ohms resistance. Since load 300 would have much larger resistance than 0.025 Ohms, voltage drop across points A and B caused by load 300 is negligible to optocoupler emitting diode 602 such that, without having to specially calibrate a typical relay or diode, circuit breaker circuitry 20 can be connected to most any load 300 and operate properly.

Figure 9:
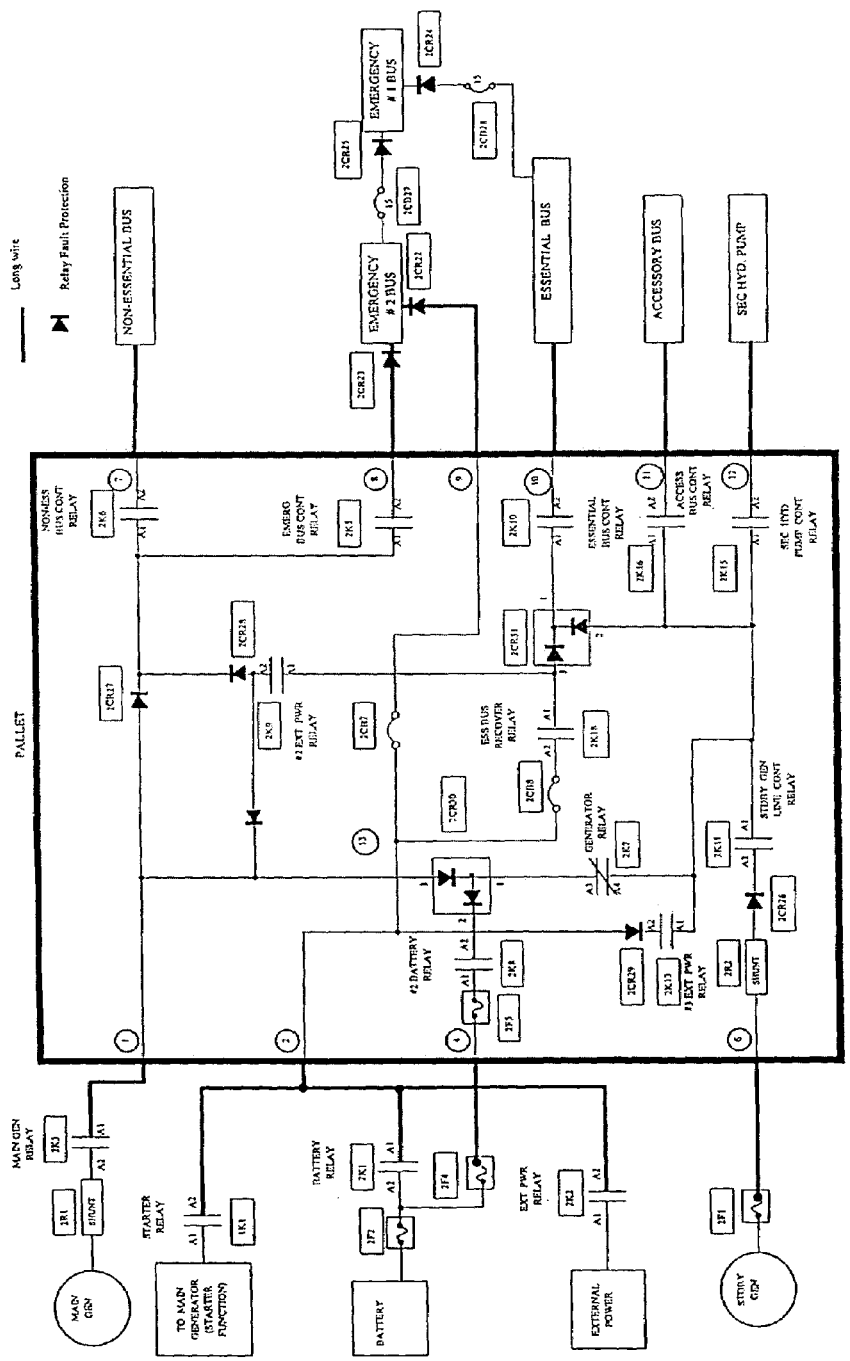
FIG. 9 is a schematic of a circuitry for powering various parts of a helicopter including a circuit breaker circuitry in accordance with an embodiment of the present invention that protects against ground faults.

Circuit breaker circuitries 10, 20, as described above, may be integrated into the circuit depicted in FIG. 9 which is used for powering various parts of a helicopter. Circuit breaker circuitries 10, 20 are designated by 2K6, 2K5, 2K10, 2K16, and 2K15 in the schematic. These circuit breaker circuitries act to protect power sources from electrical faults. It should be noted that circuit breaker circuitry 10, 20 can also be employed in circuits powering various parts of an airplane or any other types of aircraft, as well as numerous other applications, both for aviation and non-aviation. In general, the present invention can be used wherever circuit breaker circuitry is typically used.

The disclosed embodiments can be modified by a person skilled in the art without deviating from the scope of the present invention. For example, time delay relay 502 may be replaced with a logic circuit that can isolate sensor circuitry 400 or 600 from current spikes that may occur when connecting power source 200 to load 300.

While the invention has been described in conjunction with specific embodiments, it is evident that numerous alternatives, modifications, and variations will be apparent to those skilled in the art in the light of forgoing descriptions. The scope of this invention is defined only by the following claims.

The invention claimed is:

1. An electric power fault detection and isolation apparatus, comprising:
   a control circuit comprising a control relay having main contacts capable of connecting a power supply to a load; and
   a sensor circuit comprising:
   a sensing diode for detecting one or more voltage drops across the main contacts, each such voltage drop corresponding to a transient, arc, or ground fault that causes fault currents to pass through the main contacts; and
   a tripping circuit coupled to the sensing diode and the control relay, wherein the tripping circuit de-energizes the control relay in response to the faults detected by the sensing diode, thereby disconnecting the power supply from the load.

2. The apparatus of claim 1, wherein the sensor circuit operates independent of the load.

3. The apparatus of claim 1 further comprising:
   a time delay circuit coupled to the control circuit and the sensor circuit, wherein the time delay circuit isolates the sensor circuit from the main contacts during a predetermined time period after the control circuit connects the power supply to the load.

4. The apparatus of claim 1, wherein the tripping circuit further comprises a counting circuit that counts the number of faults detected by the sensing diode and de-energizes the control relay after a predetermined number of faults.

5. The apparatus of claim 1 wherein the sensing diode is an optocoupler emitting diode and the sensor circuit further comprises an optocoupler detecting diode.

6. The apparatus of claim 5, wherein the sensor circuit further comprises an AND gate that receives a signal from the optocoupler detecting diode as an input.

7. An electric power fault detection and isolation apparatus, comprising:
   a control circuit comprising a control relay having main contacts capable of connecting a power supply to a load;
   a sensor circuit coupled to the control circuit, wherein the sensor circuit detects a voltage drop across the main contacts when one or more of a transient, arc, and ground fault currents pass through the main contacts;
   a tripping circuit coupled to the sensor circuit and the control relay, wherein the tripping circuit de-energizes the control relay in response to faults detected by the sensor circuit, thereby disconnecting the power supply from the load; and
   a time delay circuit coupled to the control circuit and the sensor circuit, wherein the time delay circuit isolates the sensor circuit from the main contacts during a predetermined time period after the control circuit connects the power supply to the load.

8. A method for isolating a power supply from one or more of transient, arc, and ground faults comprising the steps of:
   detecting the one or more faults by sensing, using a diode, one or more voltage drops across main contacts connecting a power supply to a load; and
   opening the main contacts in response to the detected faults.

9. The method of claim 8, wherein the step of detecting further comprises:
   generating a signal for each voltage drop sensed by the diode;
   counting the generated signals; and
   comparing the number of generated signals counted to a predetermined number.

10. A method for isolating a power supply from one or more of transient, arc, and ground faults comprising the steps of:
    detecting the one or more faults by sensing, using a diode, one or more voltage drops across main contacts connecting a power supply to a load;
    opening the main contacts in response to the detected faults; and
    isolating the diode from the main contacts during a predetermined time period after the main contacts connect the power supply to the load.

11. An electric power fault detection and isolation apparatus, comprising:
    a control circuit comprising a control relay having main contacts capable of connecting a power supply to a load; and
    a sensor circuit comprising:
    means for detecting one or more voltage drops across the main contacts, each such voltage drop corresponding to a transient, arc, or ground fault that causes fault currents to pass through the main contacts; and
    a tripping circuit coupled to the sensing means and the control relay, which de-energizes the control relay in response to faults detected by the sensing means, thereby disconnecting the power supply from the load.

* * * * *